United States Patent [19]

Garvey et al.

[11] Patent Number: 4,762,736
[45] Date of Patent: Aug. 9, 1988

[54] PROCESS FOR FORMING A COATING

[75] Inventors: Michael J. Garvey; Ian C. Griffiths, both of Merseyside, United Kingdom

[73] Assignee: Unilever Patent Holdings, B.V., Rotterdam, Netherlands

[21] Appl. No.: 41,330

[22] Filed: Apr. 22, 1987

[30] Foreign Application Priority Data

Apr. 24, 1986 [GB] United Kingdom ............... 8610025

[51] Int. Cl.$^4$ .............................................. B05D 1/20
[52] U.S. Cl. ................................... 427/215; 427/214; 427/434.3
[58] Field of Search ............... 427/434.3, 430.1, 215, 427/214

[56] References Cited

U.S. PATENT DOCUMENTS

| 1,572,461 | 2/1926 | Beausejour | 427/430.1 |
| 2,926,390 | 3/1960 | Talalay et al. | 427/430.1 X |
| 3,752,680 | 8/1973 | Moore | 427/430.1 X |
| 4,093,757 | 6/1978 | Barraud et al. | 427/434.3 |
| 4,404,255 | 9/1983 | Peiffer et al. | 427/215 X |

*Primary Examiner*—Shrive P. Beck
*Attorney, Agent, or Firm*—Cushman, Darby & Cushman

[57] ABSTRACT

This invention discloses the preparation of coatings on substrates. The coating is derived from a film formed at a sol air interface and the film is bonded to the substrate by direct contact. The coating preferably contains silica.

8 Claims, 2 Drawing Sheets

PROCESS FOR FORMING A COATING

This invention relates to the formation of coating films. More particularly it relates to a process for forming a compact array of particles at an interface and the subsequent deposition of the particles on a support to give a dense, compact layer of the particles.

The formation of thin oxide coatings is an area of active research targeted to several potential end uses. In the area of microelectronics and communications, it is desirable to form thin, controlled thickness and compact insulative coatings of oxide particles as described, for example in European Patent Application No 0 133 916 and U.S. Pat. No. 3 633 277. European Patent Application No 0 133 916 describes a process for forming controlled thickness oxide coatings by alternately dipping the substrate into solutions containing particles of silica and alumina. U.S. Pat. No. 3 663 277 describes a process for forming compact silica layers by spinning the substrate while simultaneously depositing a selected number of drops of colloidal silica sol. In the area of chromatography, U.S. Pat. No. 4 477 492 refers to the difficulty in preparing good quality superficially porous chromatographic supports and describes a process for preparing an improved material by spray drying a mixture of glass beads, as the impervious core, and silica sol to provide the porous coating.

In U.S. Pat. No. 2 801 902 Alexander et al disclosed a process for the preparation of negatively-charged planar aggregates or platelets of silica spheroids which were produced from silica sols containing a trace amount of cationic surfactant. In their specification they suggested that aggregation occurred by a process of preferential, directional aggregation of the silica spheroids in the bulk of the dispersion and they suggested that the process involved heating of the surfactant-containing sol to above 60° C. to strengthen the platelets by deposition of silica to spaces between the spheroids which, when so bonded together, constituted the planar aggregates.

The present inventors suggest that the process of aggregation of silica spheroids into apparently planar aggregates is a consequence of the partial hydrophobing of the negatively-charged silica by the adsorbed cationic surfactant and the subsequent adsorption, or deposition, of the silica particles at a gas, oil or hydrophobic solid interface, to form a compact monolayer of silica spheroids. It is thought that these silica spheroids subsequently gel to form a monolayer replica of the interface at which they have been formed.

It has now been found that such surfactant containing sols can be used to form films which can be deposited onto a substrate by various coating techniques to form one or more coatings on the substrate.

Accordingly the present invention provides a process for the deposition of a coating on a substrate characterised by generating an interface on a sol containing a surfactant, the amount of surfactant being sufficient to cause a film of colloidal material comprising the sol to form at the interface, and contacting the substrate and film so as to deposit the film onto the substrate.

The substrate for use in the invention is not critical except that it should be stable to the conditions of the process. The material of the substrate can be, for example, glass, ceramic, metal, silicon or organic or polymeric material, when sintering is unnecessary, or combinations of these materials. The geometry of the substrate is not critical and may be, for example, a single slab of material, small fragments or more complex structures. The substrate is preferably cleaned before use with acids or solvents and if necessary rendered hydrophobic by, for example, the adsorption of a monolayer of cationic surfactant.

The present process can thus be employed in a wide range of uses. The process is particularly applicable to any situation in which a very thin layer of material requires coating onto a substrate in order to change or effect the properties of the substrate surface. Practical examples include: coating wax and/or glass patterns for making ceramic shell moulds for use in metal casting; resurfacing etched or abraded surfaces such as household and industrial enamel and plastic surfaces e.g. tiles and sanitary ware; resurfacing glassware, chinaware and crockery which has become heavily scratched by repeated use such as for example occurs in automatic dishwashing machines; modifying surface properties such as to effect light transmission and/or reflection of a substrate; use as an electrical insulating layer on a substrate; and used to coat oxide particles on to recording tapes. If desired a subsequent treatment can be applied to improve cohesion and/or adhesion.

Preferably the substrate and film are contacted so as to deposit the film onto the substrate surface by drawing the substrate through an air/liquid interface at which the film has formed. In general terms, the substrate can be coated by moving the interface relative to the substrate. In addition to for example dipping and withdrawing the substrate through the interface, other modes of coating can include: draining a film interface for example in the form of droplets of a sol down a substrate; allowing the sol having the interface to rise over the substrate e.g. beads, so as to immerse the beads; and allowing the sol to drain over or out of the substrate surface for example a domestic bath, sink or the like. Other modes of application such as spraying and applying with a cloth or the like can be envisaged. In all cases more than one coating can be applied by the same or by different routes. If desired subsequent coatings may be applied which may be of the same or different colloidal materials.

The colloidal material is preferably selected from the group comprising insoluble or sparingly soluble inorganic particles, organic particles and polymeric particles mixtures thereof. By "colloidal material" we mean a material having a particle size of less than about 1 μm. The particles can be generally spheroidal, plate-like, rod-shaped or any other three dimensional shape. The sol is suitably an aqueous medium.

The colloidal material preferably includes silica. Examples of other suitable colloidal material include alumina, magnetic oxides, halide salts and latex particles. Mixtures of colloidal material containing at least 30 wt % silica are preferred. Suitably the colloidal material comprises 0.001 to 30 wt % colloidal material, more suitably 0.1 to 10 wt % with respect to the total weight of the sol. Higher concentrations can however be used if aggregation can be controlled. Lower concentrations can be used but more quickly exhausted.

The silica dispersions employed in the present process are typified by Ludox HS40 (ex Du Pont de Nemours & Co.) and are further descibed for example within U.S. Pat. No. 2 801 902. In general a negatively charged silica sol containing amorphous silica is used. The silica spheroids compose the sol suitably have a diameter greater than 5 nm and no greater than about 100 nm, preferably no greater then about 50 nm. It is desirable although by no means essential that the sols are composed of spheroidal particles of fairly uniform particle size.

The colloidal material, such as silica, of the dispersion is rendered partially hydrophobic by the addition of a cationic surfactant. In less preferred processes the use of anionic surfactants may be necessary if the particle has a positive charge in solution, e.g. positively-charged polyvalent metal-oxygen compound coated silica particles as Kieselsol 200 S (ex Bayer). Suitable surfactants are described for example with U.S. Pat. No. 2 801 902 and include cationic agents in which the positive charge is borne by such atoms as nitrogen, phosphorus, sulphur and arsenic. Typical of cationic surface active agents are cetyl methyl ethyl sulphonium bromide, and similar phosphonium and arsonium compounds may be used. The preferred group however of cationic surface active agents are the organic nitrogen bases. Examples of this type of compound are cetyl trimethyl ammonium bromide, dodecyl trimethyl ammonium bromide, cetyl trimethyl ammonium chloride, lauryl pyridinium chloride, octyl trimethyl ammonium chloride, decyl trimethyl ammonium chloride and octadecyl trimethyl ammonium chloride.

The concentration of surfactant necessary to partially hydrophobe the silica particles is less than that required for monolayer coverage of the particles which is given by the expression $3/(r\rho AN)$ moles $g^{-1}$ where r is the particle radius, $\rho$ is the particle density, A is the area of the surface occupied by a surfactant molecule and N is Avogadro's number. The expression approximates to $0.006/r$ (nm) moles of surfactant per gram of particles. The amount of surfactant is, therefore, less than $0.006/r$ moles of surfactant per gram of particles where r is the particle radius in nanometers. In practice, a few percent of the above amount is used, for example, 0.003 g per gram of silica particles.

Embodiments of the present invention will now be described by way of example with reference to the following Examples and the accompanying drawings; wherein.

EXAMPLE 1

An aqueous dispersion of silica sol, Lubox HS40 (ex Du Pont de Nemours & Co) containing approxiately 40% w/w silica particles of approximately 13 nm diameter was diluted with water to 10% w/w silica. To this dispersion was added an equal volume of 0.03% w/w cetyl trimethyl ammonium bromide (CTAB) solution while stirring with a magnetic stirrer. There was no formation of permanent visible aggregates in the dispersion.

The dispersion was allowed to stand with formation of a rigid skin formed at room temperature at the air/water interface. The presence of the skin was demonstrated by sprinkling a hydrophobic pigment powder onto the surface whereupon the immobile nature of the skin is observed. On swirling the dispersion, the powder is observed to be embedded in the interfacial skin unlike the same powder on a pure water interface where clustering of the powder occurs.

A glass microscope slide was washed in 50% nitric acid, rinsed with water then hydrophobed by soaking in 0.1% w/w CTAB solution followed by copious rinsing in distilled water. The slide was then dipped in and out of the interface using a mechanical drive dipping apparatus. On withdrawal of the slide, the silica embedded pigment could be observed to migrate towards the glass slide as the silica skin was collected by the substrate.

EXAMPLE 2

Figure 1:
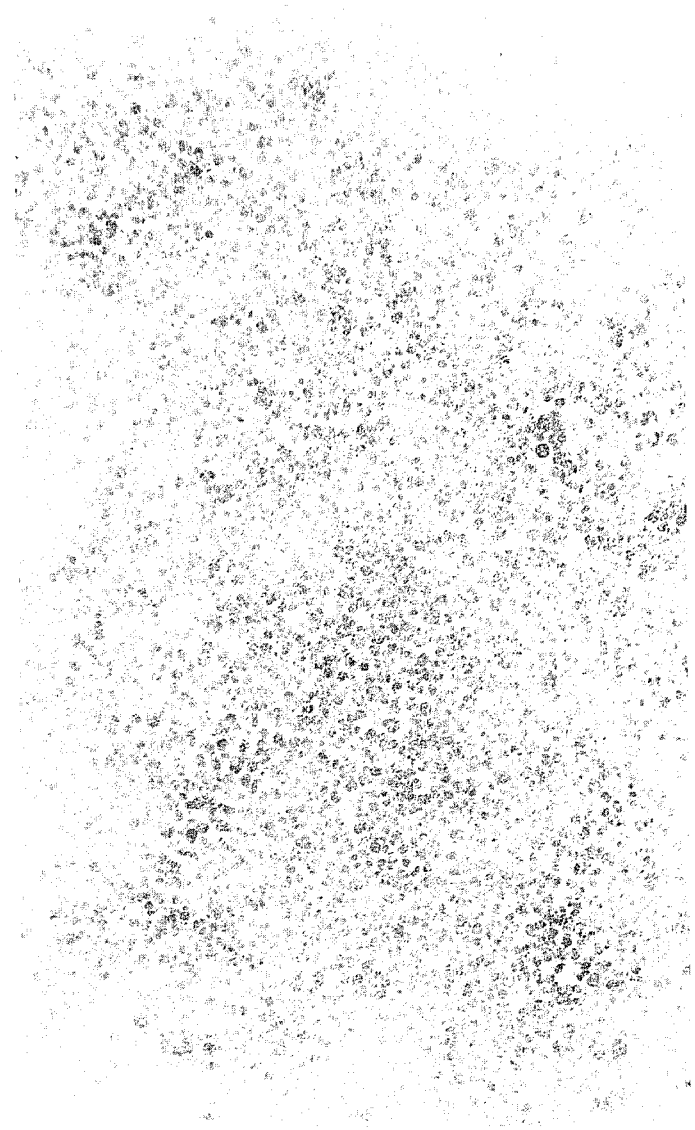
FIG. 1 is an electronmicrograph of the product of Example 2.

A fresh sample of the above silica sol/cationic surfactant dispersion was prepared. A carbon coated copper electronmicroscope grid was hydrophobed as above and dipped in and out of the interface. The grid was gently touched against a paper tissue to remove excess liquid and then the grid examined by transmission electronmicroscopy. The electronmicrograph showed the remarkably uniform coverage of the surface with a layer of silica one or two particles thick. A reproduction of the electronmicrograph is given in FIG. 1. The silica spheres were estimated to have an average diameter of 14 nm.

EXAMPLE 3

A dispersion containing 4% w/w silica (Ludox HS40) and 0.013% w/w CTAB was prepared. No permanent visible aggregates were observed. A glass microscope slide was washed and hydrophobed as in Example 1 and was partially dipped in and out of the interface. The glass slide was allowed to dry in the air. The presence of a uniform coating on the slide could be observed by visual observation of the reflection properties.

EXAMPLE 4

500 g of glass beads, sieved to a size range of $>180 \mu$ to $<250 \mu$ were washed with 50% nitric acid, washed thoroughly with distilled water then hydrophobed by immersion in 0.2% CTAB solution for one hour followed by washing with a copious amount of distilled water. The hydrophobed glass beads were than packed into a glass column (2.5 cm diameter), fitted with a glass frit support, then further washed with distilled water. The column was then allowed to fill, from the bottom upwards, by gravity feed, with a dispersion containing 5% w/w colloidal silica (Ludox HS40) and 0.015% w/w CTAB to a level above the glass bead packing. The dispersion was then allowed to drain from the column and excess liquid removed by a downward current of air. The column was allowed to dry at room temperature. The above procedure was repeated a further seven times. The glass beads were then dried at 140° C. for one hour and then heated to 600° C. for two hours. The heating improved the adhesion and cohesion of the coating.

Figure 2:
FIG. 2 is an electronmicrograph of the product of Example 4.

The glass beads were examined by setting them in resin and fracturing with a microtome blade. They were examined by transmission electronmicroscopy and the electronmicrograph showed the multilayer coating of colloidal silica particles. A reproduction of the electronmicrograph of the cross-section of the multilayer coating is given in FIG. 2. The silica particles were estimated to have an average diameter of 14 nm.

EXAMPLE 5

A glass microscope slide was roughened with carborundum powder to create an opaque glass, then cleaned and hydrophobed as in Example 1. The slide was then successively dipped in and out of the interface as described in Example 1 but decreasing the extent of dipping on each dip and permitting the slide to dry in the air between immersions. Layers of silica of increasing thickness could be observed on the glass slide. An improvement in the reflective properties of the glass could be observed after three or four successive dippings.

EXAMPLE 6

A dispersion of silica sol/CTAB was prepared as in Example 1 and a glazed ceramic tile, first washed and hydrophobed, was partially dipped in and out of the interface then allowed to dry in the air. The tile, inclined at a slight angle, was then heated in a furnace up to a temperature of 650° C. The uncoated portion of the tile had a wrinkled appearance due to partial melting of the ceramic whereas the coated portion retained a smooth appearance.

EXAMPLE 7

A wax disc was prepared by allowing molten paraffin wax (melting point approximately 49° C.) to solidify on the surface of water contained in a beaker. An aqueous dispersion was prepared containing 5% w/w colloidal silica (Ludox HS40) and 0.015% w/w CTAB. The disc was slowly dipped and withdrawn three times through the interface of the dispersion so that on each occasion the same one half of its surface was immersed. The disc was allowed to dry between subsequent dips.

A wax disc was thus prepared having one radial half only coated with a multilayer coating of colloidal silica particles. Drops of distilled water were placed on both the coated and the uncoated halves of the disc and their contact angles assessed visually. The drops on the deposited hydrophilic silica coating wetted the surface more readily than those on the uncoated wax surface.

EXAMPLE 8

One radial half of a disc of bath enamel was etched by immersing it for 1 hour in Caro's acid (5% $H_2SO_5$) The disc was then rotated tnrough 90° C. about its main axis and its lower radial half was slowly dipped and withdrawn once through the interface of the surface of a dispersion containing 5% w/w colloidal silica (Ludox HS40) and 0.015% w/w CTAB.

The disc thus had four sectors of substantially equal area comprising respectively: untreated bath enamel; etched bath enamel; etched and coated bath enamel; and coated bath enamel. A visual assessment of the four areas showed that the etched and subsequently coated sector to have a finish comparable to the original untreated bath enamel surface.

EXAMPLE 9

An aqueous dispersion of silver iodide was prepared by adding slowly and with rapid stirring 50 cm³ of 0.1M silver nitrate solution to 50 cm³ of 0.105M potassium iodide solution. 20 cm³ of the resulting dispersion were diluted with 20 cm³ distilled water. The resulting 40 cm³ of dispersion were mixed rapidly with 40 cm³ of a 0.001% w/w aqueous CTAB solution. No aggregation was observed.

A glass microscope slide was hydrophobed by immersion in a 1% w/w aqueous CTAB solution and then thoroughly rinsed in distilled water. The resulting glass slide was then slowly dipped into and withdrawn from, once only, the interface on the silver iodide and CTAB dispersion. A visual inspection of the slide showed there to be a clearly visible film of silver iodide on the slide.

EXAMPLE 10

A surfactant free polyvinyl acetate and ethylene copolymer latex containing 8.2% ethylene as copolymer was diluted with distilled water to a solids concentration of 1% w/w. 40 cm³ of this aqueous dispersion were mixed, rapidly, with 40 cm³ of a 0.0025% w/w aqueous CTAB solution. No aggragation was observed.

A clean glass slide was dipped into and withdrawn, once only, through the interface on the surface of the dispersion. A visual assessment of the slide showed there to be a clearly visible latex film on the slide.

We claim:

1. A process for the deposition of a coating on a substrate characterised by generating an interface on a sol containing a surfactant, the amount of surfactant being sufficient to cause a film of colloidal material comprising the sol to form at the interface, and contacting the substrate and film so as to deposit the film onto the substrate.

2. A process as claimed in claim 1 in which colloidal material is selected from the group consisting of insoluble or sparingly soluble inorganic particles, organic particles, polymeric particles and mixtures thereof.

3. A process as claimed in claim 1 in which the colloidal material includes silica.

4. A process as claimed in claim 3 in which the sol includes 0.001 to 30 wt % silica with respect to the total weight of the sol.

5. A process as claimed in claim 1 in which the sol includes an amount of surfactant less than that required to form a monolayer according to the expression $3/\rho r A N$ moles g$^{-1}$.

6. A process as claimed in claim 1 in which the sol includes an amount of surfactant in the range of 0.1 to 100 mg per gram of colloidal material.

7. A process as claimed in claim 1 in which the substrate is drawn through the interface at which the film has formed so as to contact the film and the substrate.

8. A process as claimed in claim 1 in which the substrate is in the form of beads and the sol surfactant mixture is raised to immerse the beads at least once to deposit a coating on the beads.

* * * * *